June 14, 1966  G. KEMMNITZ  3,255,614
PROCESS FOR THE PRODUCTION OF REINFORCING INLAYS FOR
RUBBER ARTICLES
Filed Jan. 22, 1964  2 Sheets-Sheet 1

INVENTOR:
GÜNTER KEMMNITZ
BY
ATT'YS

INVENTOR:
GÜNTER KEMMNITZ 3,255,614
PROCESS FOR THE PRODUCTION OF REINFORCING INLAYS FOR RUBBER ARTICLES
Günter Kemmnitz, Cologne-Weidenpesch, Germany, assignor to Glanzstoff-Courtaulds G.m.b.H., Cologne-Weidenpesch, Germany
Filed Jan. 22, 1964, Ser. No. 341,477
Claims priority, application Germany, Feb. 3, 1963, G 34,180
3 Claims. (Cl. 66—192)

The present invention relates to the production of fabrics of especially high tearing strength and low extension which are excellently suited as reinforcing inlays for commercial rubber articles. The subject application is a continuation-in-part of application Serial No. 255,376, which was filed on January 31, 1963, now abandoned.

The rubber articles used for the most diverse technological purposes, such as vehicle air tires, hoses, conveyer belts and drive belts, contain textile reinforcing inlays which are supposed to impart to them certain necessary mechanical properties. Textiles that are suitable as reinforcing inlays must have high tearing strength, low extension, good dynamic behavior and a good adhesion to rubber.

Attempts have been made to obtain these properties in various ways. Thus, as reinforcing inlays for rubber articles, besides textiles, fabrics are known into which warp threads are worked, extended or conducted in windings. While certain improvements are possible to achieve by those means, it has not been possible to satisfy fully the demands which have been increased by raised performance requirements. Thus, for example, the dynamic forces which act in various ways on a vehicle air tire require reinforcing inlays with properties which considerably exceed those attained hitherto.

The use of extended, bent or coiled reinforcing threads in knitted inlays, for example, for vehicle air tires, is not by itself sufficient to produce tires with optimum use properties, because the properties of the material, its composition and finishing, as well as its processing, must work together in a suitable mannner.

It has now been found that rubber reinforcing inlays of excellent quality, especially strongly reduced extensibility, are obtained, if thread material of high quality in suitable composition and finish is worked in a special manner into fabrics and into these, in a manner in itself known, extended warp threads are tied in.

Figure 2:
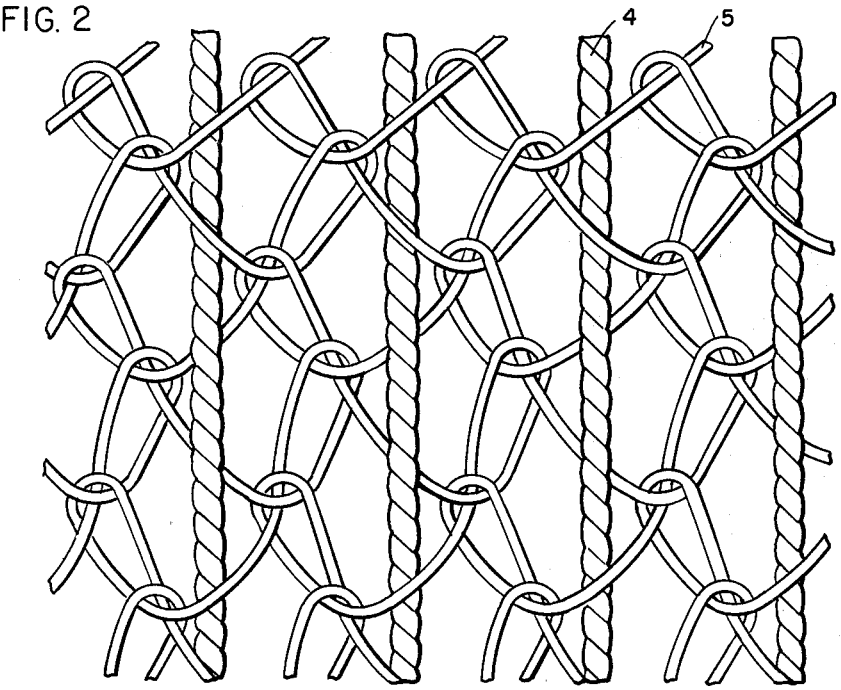
Figure 3:
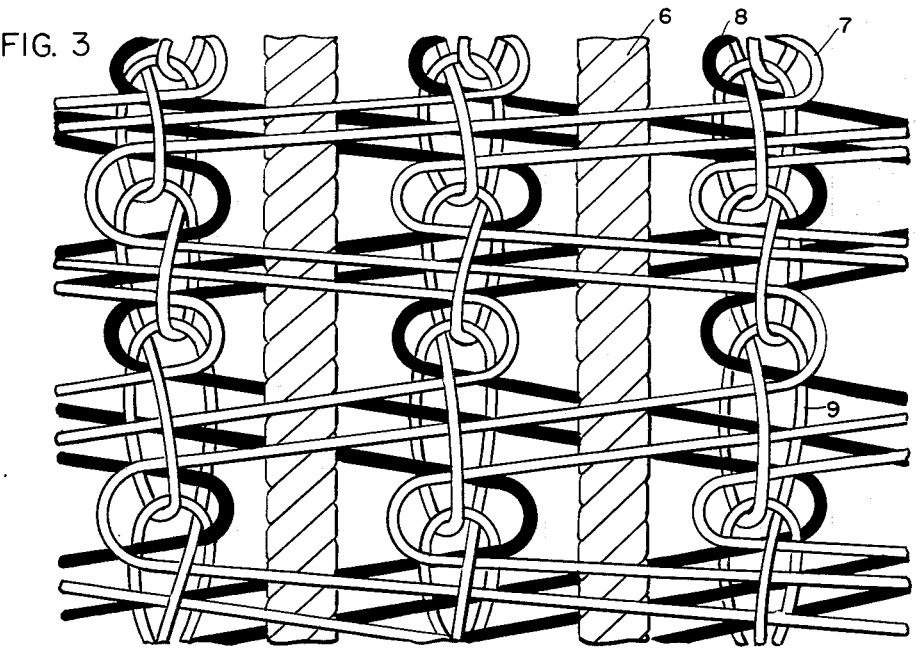

The production of such knitted reinforcing inlays traversed by straight longitudinal threads (warp threads) for rubber articles takes place in such a manner that cord yarns or cord twines prepared with polyvinyl alcohol solution and dispersions of synthetic resins and natural or synthetic rubber, of rayon or synthetic threads, especially polyamides or polyesters, with a breaking stretch of less than 4%, are braided and tied in band form on a crochet-galloon machine (FIG. 1) or are knitted as a tricot fabric (FIG. 2) or in the form of a marquisette lay (FIG. 3). Reinforcing inlays produced according to the invention as 3 cm. wide bands, for example, of 1650 den. longitudinal threads/2-ply twine and 1650 den. laying therads/simple yarn have a transverse strength which lies roughly 100 times higher than that of merely cemented little bands hitherto used (see Tables 1 and 2). The transverse strength is the tearing strength acting perpendicularly to the warp thread direction and is especially important for band-form ribbon inlays or wide fabrics or braids, as, for example, in conveyer belts.

For the production of rubber reinforcing inlays according to the invention there are suitable both cord rayon threads or yarns and twines and also yarns and twines which are produced from suitable synthetic threads, as, say, from polyamides or polyester material. The fabrics consist either of a single material, such as, for example, cord rayon threads, yarns or twines pretreated according to known processes, of cord yarns or twines of synthetic threads or else of both, in which process for the longitudinal threads (warp threads) or the base laying threads (weft threads) there may be used, at will, cord rayon or cord threads of synthetic material, such as, for example, of polyamides or polyester (polyethylene terephthalate). In each of the cases mentioned, the longitudinal threads are preferably formed of twines or cable twines pretreated according to the field of use, while the laying threads may consist of endless yarns, twisted endless yarns or even of spun threads.

The pretreatment of the various threads may take place either by a wet afterstretch in the case of cord rayon, by a time-temperature stretch treatment with polyamides or by a hot afterstretch in the case of polyesters. For rayon threads and twines, especially those which are intended for reinforcing inlays for vehicle air tires a special treatment is recommended, such as is described below.

EXAMPLE OF AFTERTREATMENT OF RAYON THREADS

For the aftertreatment threads produced according to the usual viscose process are used, which were already afterstretched by 8 to 10% and are present as twisted, untwisted threads or as threads merely provided with a protective twist. Sixteen (16) parallel-running individual threads of the denier 1650 den. are introduced into a drawing-in mechanism and, by means of a further drawing-off device, conducted through a 10% aqueous polyvinyl alcohol solution. Here there is accomplished a stretch of 6 to 12%. The thread bundle passes, at the end of the bath, over strips on which the excess adhering polyvinyl alcohol solution is removed in a drying zone to the first drawing-off device. Hereupon the thread bundle is conducted through another drying zone to the final drawing-off device, in which process a further 3% stretch is carried out. The temperature in the hot air drying zone should be above 130°, preferably 160° C. and more. The level of the temperature is governed according to the draw-off speed or according to the desired residual moisture, which should lie below 8%. The thread bundle, thus dried and cemented, is then again, under further stretching of 3% conducted to the impregnating bath, described in the following, of especially high concentration and in a second drying zone is dried to 3% and less of moisture.

The impregnating solution used is an aqueous alkaline dispersion which contains synthetic resins (for example, resorcin-formaldehyde) and natural and/or synthetic rubber, the total solid matter content of the impregnating solution amounting to more than 20%, preferably 25% and more. The thread bundle thus treated is then rinsed according to a usual process.

Before the total treatment of the threads, the strength (furnace dry) amounted to 5.5 g./den. and the breaking extension (stretch) (furnace dry) to 9.0%. After the treatment of the threads with polyvinyl alcohol and the impregnating solution the strength (furnace dry) was 5.3 g./den. and the breaking stretch (furnace dry) was 3.0%.

From the comparison of the strength and extension values it is apparent that the strength has remained essentially unchanged, while the extension (stretch) after the above mentioned treatment, achieves an extremely low value of 3.0% never hitherto achieved. The threads of twines thus aftertreated are used in the production of knitted reinforcing inlays, especially as longitudinal threads.

It is also possible, if need be, to carry out the aftertreatment described on the fabric itself. Further, it is possible to save one process step in this aftertreatment if a mixture is used of the polyvinyl alcohol solution with the impregnating solution mentioned in the ratio of 1:1 to 1:4.

It is also possible to carry out the above described aftertreatment on a fabric in such a way that only one impregnating solution is used. The strength thus attained of a corresponding knitted band (longitudinal threads consist of 10 cord rayon twines 1650 den., 2-ply twined, base laying threads of 1650 den. cord rayon yarns) amounts to 3.8 g./den., the extension to 3.6%.

Figure 1:
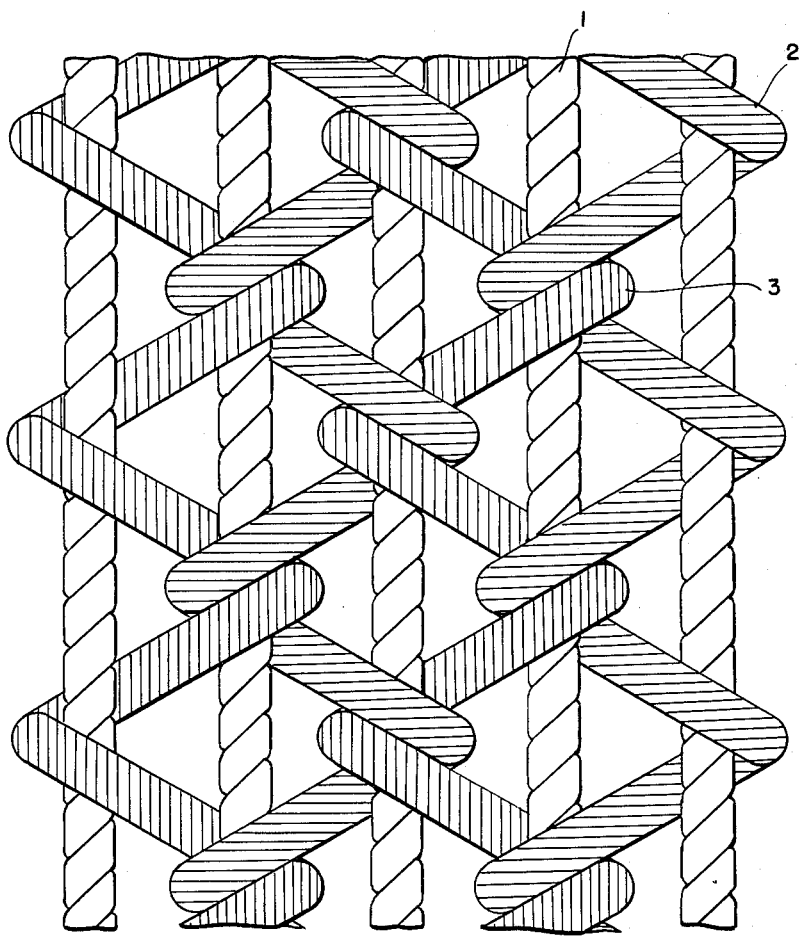

The fabrics produced according to the invention, which in the form of knitted bands serve as reinforcing inlays for technical rubber products, are produced especially advantageously in the three samples which are represented in FIGS. 1 to 3.

The fabric shown in FIG. 1 is produced on a crochet-galloon machine and can be regarded as a braided or knotted (tied) band. There the specially impregnated yarn or twine strands desginated as unbent warp 1 are bound with a braid thread 2, which is conducted in a zig-zag pattern, so that this braid thread, through zig-zag construction, binds two adjacent warp threads and the next warp thread is bound by a new braid thread 3 conducted in zig-zag path, in such a way that the braid thread 3 loops the preceding warp thread where this latter has already been looped by the first braid thread 2.

The tricot fabric according to FIG. 2 consists of unbent longitudinal threads 4 (warp threads) and the base laying threads 5 (woof threads).

FIG. 3 shows a fabric in a marquisette lay. Here the unbent longitudinal threads 6 form the lining warp and the cross-laid threads 7 and 8 smooth lining lays, which are bound together between the lining warp 6 by a fringe lay 9.

The following two tables set forth the superiority of the fabric produced according to the invention over conventional bands and fabrics.

*Table 1.—Transverse strength of the cemented bands hitherto used as rubber reinforcing inlays*

| Band Structure | Width of sample in cm. | Absolute transverse strength in kp. | Relative transverse strength in kp./cm. |
|---|---|---|---|
| Yarn 1650 den | 3 | 1.2 | 0.4 |
| 2-ply twine 1650/2 | 3 | 0.6–1.2 | 0.2–0.4 |
| 3-ply twine 1650/3 | 3 | 0.3 | 0.1 |

*Table 2.—Transverse strength of the fabrics produced according to the invention for the reinforcement of technological rubber articles*

| Band Structure | Width of sample in cm. | Absolute transverse strength in kp. | Relative transverse strength in kp./cm. |
|---|---|---|---|
| Lengthwise threads 1,650 den. 2-ply twine, Laying threads 1,100 den. simple yarn | 3 | 33.6 | 11.2 |
| Lengthwise threads 1,650 den. 2-ply twine, Laying threads 1,650 den. simple yarn | 3 | 44.0 | 14.7 |

From the two tables it is apparent that the fabrics produced according to the invention have a transverse strength which is roughly 100 times higher than that of the cemented bands hitherto used. This extraordinarily high transverse strength with much diminished longitudinal extension is the result of an especially expedient and thereby effective combination partly of individual measures in themselves known in principle, in which combination the thread material, its composition, finishing and textile processing yield an optimum effect.

In a special form of execution of the process according to the invention two or more warps are grouped together, so that fabrics with warps of two or more threads result. Thereby it is possible considerably to reduce the transverse stretching capacity of the fabrics existing as little bands, as well as the space requirement.

The special knitted fabrics and braids produced according to the invention are excellently suited as reinforcing inlays for vehicle air tires and conveyer belts.

The word "interwined" in the appended claims shall be interpreted to mean braiding or knitting of the threads substantially as heretofore described.

Obviously many modifications and variations of the invention as hereinbefore set forth may be made without departing from the spirit and scope thereof, and therefore only such limitations should be imposed as are indicated in the appended claims.

I claim:

1. A reinforcing inlay for rubber articles which comprises essentially parallel, closely spaced, elongated warp cords having a breaking stretch of less than 4%, and cross-laid weft threads intertwined with said warp cords to provide a fabric reinforcing inlay wherein said warp cords are composed of rayon threads which have been impregnated with polyvinyl alcohol, a synthetic resin, and a rubber.

2. A reinforcing inlay as claimed in claim 1 wherein said synthetic resin is a resorcinol-formaldehyde resin.

3. A reinforcing inlay for rubber articles which comprises essentially parallel, closely spaced, elongated warp cords having a breaking stretch of less than 4%, and cross-laid weft threads intertwined with said warp cords to provide a fabric reinforcing inlay wherein said warp cords are composed of rayon threads which have been impregnated with a synthetic resin and a rubber.

References Cited by the Examiner

UNITED STATES PATENTS

| | | | |
|---|---|---|---|
| 321,153 | 6/1885 | Stowe | 66—192 |
| 446,084 | 2/1891 | Stowe | 66—192 |
| 1,407,012 | 2/1922 | Branson | 66—192 |
| 1,451,975 | 4/1923 | Branson | 66—192 |
| 1,531,548 | 3/1925 | English | 66—192 X |
| 2,603,852 | 7/1952 | Fleischer | 66—193 X |
| 2,706,898 | 4/1955 | Gross et al. | 66—193 |
| 2,968,085 | 1/1961 | Matthews | 66—190 X |
| 3,049,901 | 8/1962 | Greczin | 66—190 |
| 3,086,274 | 4/1963 | Arnett | 28—74 |

DONALD W. PARKER, *Primary Examiner.*

L. K. RIMRODT, *Assistant Examiner.*